United States Patent
Umehara et al.

(10) Patent No.: US 7,599,024 B2
(45) Date of Patent: Oct. 6, 2009

(54) SUBSTRATE PROVIDED WITH BANK AND SUBSTRATE PROVIDED WITH COLOR PATTERN

(75) Inventors: Masaaki Umehara, Tokyo (JP); Teruhiko Kai, Tokyo (JP)

(73) Assignee: Toppan Printing Co., Ltd. (JP)

( * ) Notice: Subject to any disclaimer, the term of this patent is extended or adjusted under 35 U.S.C. 154(b) by 238 days.

(21) Appl. No.: 11/895,356

(22) Filed: Aug. 24, 2007

(65) Prior Publication Data

US 2009/0051748 A1    Feb. 26, 2009

(51) Int. Cl.
*G02F 1/1335*    (2006.01)

(52) U.S. Cl. .................... 349/106; 349/107; 349/108; 349/114

(58) Field of Classification Search ......... 349/106–108, 349/114
See application file for complete search history.

(56) References Cited

U.S. PATENT DOCUMENTS

2004/0038138 A1* 2/2004 Kiguchi et al. ................. 430/7

FOREIGN PATENT DOCUMENTS

| JP | 07-035915 | 2/1995 |
|---|---|---|
| JP | 07-035916 | 2/1995 |
| JP | 08-166507 | 6/1996 |
| JP | 09-073010 | 3/1997 |
| JP | 3328297 B2 | 9/2002 |
| JP | 2005-352105 | 12/2005 |
| JP | 2006-084911 | 3/2006 |
| JP | 2006-163233 | 6/2006 |
| JP | 2006-243588 | 9/2006 |
| JP | 2006-251433 | 9/2006 |
| JP | 2006-267821 | 10/2006 |
| JP | 2006-276180 | 10/2006 |
| JP | 2006-284674 | 10/2006 |

* cited by examiner

*Primary Examiner*—David Nelms
*Assistant Examiner*—Phu Vu
(74) *Attorney, Agent, or Firm*—Squire, Sanders & Dempsey L.L.P.

(57) ABSTRACT

An embodiment of the present invention will be disclosed below. A substrate provided with a bank, comprising: a transparent substrate, and a bank including an ink-repellent agent on the transparent substrate. A contact angle of an upper apex portion of said bank with respect to a colored ink with a surface tension of 50 mN/m or less is 30°-60°. Pixels comprising a colored pattern are provided by ejecting colored inks by an ink-jet method into openings in the bank. ΔEab within the pixels is less than 1.

12 Claims, 1 Drawing Sheet

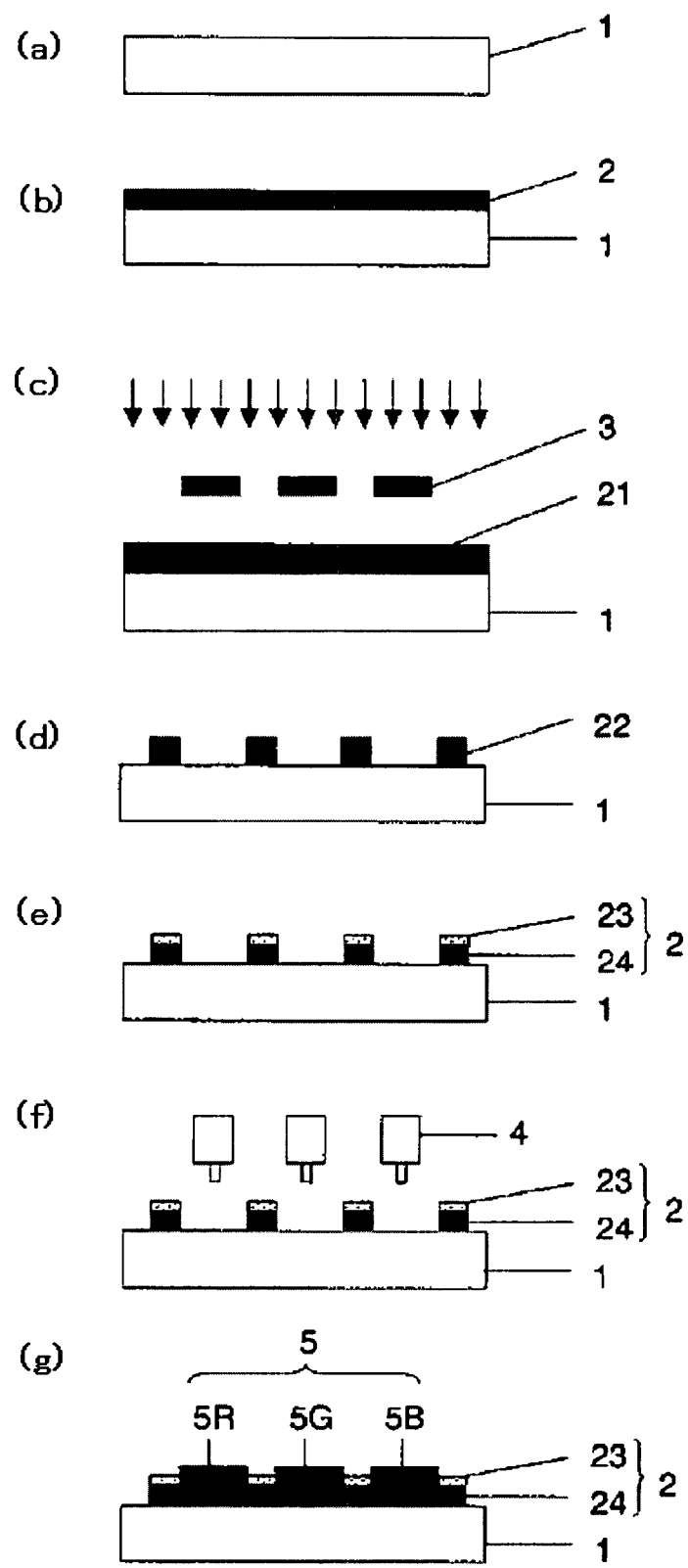
F I G . 1

SUBSTRATE PROVIDED WITH BANK AND SUBSTRATE PROVIDED WITH COLOR PATTERN

BACKGROUND OF THE INVENTION

1. Field of the Invention

The present invention relates to a substrate provided with a bank and substrates provided with a color pattern such as a color filter and an electroluminescence device for use in color display device.

2. Description of the Related Art

An ink-jet method has recently been suggested as a method for fabricating a color filter for use in a color display device such as a color liquid crystal display.

Examples of methods for manufacturing a color filter by using an ink-jet process include methods described in Patent Document 1, Patent Document 2, and Patent Document 3.

Patent Document 1 describes that in order to prevent a colored ink from spreading to the outside of a desired colored region on a glass substrate, the colored ink is fixed only in the colored region by forming a pattern in which a fluorine-containing water-repellent and oil-repellent agent is introduced in advance in a bank pattern (black matrix). Further, Patent Document 2 and Patent Document 3 describe that a bank comprising a fluorine-containing compound and/or a silicon-containing compound is provided with partition walls for preventing ink bleeding and color mixing in the coloration process.

However, with the aforementioned method, due to a difference in surface energy between the bank surface and the colored ink surface, the pattern cross section easily assumes a concave or convex shape, and pixels are extremely difficult to smooth. In particular, in the case of color filters, spectral characteristics vary depending on the pixel film thickness, and a problem associated with non-uniform pixel film thickness is that color unevenness or pixel voids easily occur and display quality is degraded.

Yet another problem is that even when the content of ink-repellent agent added to the bank is reduced in order to decrease the surface energy of the bank and make the pixel film thickness more uniform, sufficient ink repellency is not maintained on the apex portions of the bank and color mixing occurs due to overflow of ink.

With the foregoing in view, it is an object of the present invention to provide an effective control method for obtaining the desired ink repellency on a bank surface in order to obtained excellent pixel smoothness and prevent color unevenness, pixel voids, and color mixing caused by overflow of ink in a substrate provided with a bank and a substrate provided with a color pattern.

Patent Document 1: JP-A-6-347637
Patent Document 2: JP-A-7-35915
Patent Document 3: JP-A-7-35917

SUMMARY OF THE INVENTION

An embodiment of the present invention will be disclosed below. A substrate provided with a bank, comprising: a transparent substrate, and a bank including an ink-repellent agent on the transparent substrate. A contact angle of an upper apex portion of the bank with respect to a colored ink with a surface tension of 50 mN/m or less is 30°-60°. Pixels comprising a colored pattern are provided by ejecting colored inks by an ink-jet method into openings in the bank. ΔEab within the pixels is less than 1.

BRIEF DESCRIPTION OF THE DRAWINGS

FIGS. 1 (a), (b), (c), (d), (e), (f) and (g) are explanatory drawings illustrating an example of a method for manufacturing a color filter as an example of a substrate provided with a color pattern in accordance with the present invention.

| [Explanation of Reference Numerals] | |
|---|---|
| 1 | transparent substrate |
| 2 | bank |
| 3 | light shielding mask |
| 4 | ink-jet device |
| 5 | colored pattern |
| 5R | colored pattern (red) |
| 5G | colored pattern (green) |
| 5B | colored pattern (blue) |
| 21 | film of bank material coated on transparent substrate |
| 22 | pattern of bank material |
| 23 | upper apex portion of bank |
| 24 | lower portion of bank |

DESCRIPTION OF THE PREFERRED EMBODIMENTS

An embodiment of the present invention will be described below with reference to the appended drawing, but the present invention is not limited to this embodiment. FIG. 1 illustrates an embodiment of a method for manufacturing a substrate provided with a color pattern in accordance with the present invention. In the substrate provided with a color pattern shown in FIG. 1, a bank 2 is formed on a transparent substrate 1. Ink repellency of an upper apex portion 23 of the bank 2 is higher than ink repellency of a portion 24 other than the upper apex portion of the bank 2. Further, after colored inks 5 of red (R), green (G), and blue (B) colors are ejected by an ink-jet method into openings within the bank 2, a solvent is evaporated and the inks are then cured to form colored patterns 5 (5R, 5G, 5B).

A glass substrate, a quartz substrate, a plastic or the like substrate can be used as the transparent substrate 1 in accordance with the present invention.

A resin composition comprising a photoinitiator, a dispersant, a resin, a solvent, and an ink-repellent agent as the main components is used as a material for the bank 2 in accordance with the present invention.

Further, the adding of a black light shielding material to the resin composition can allow a bank to have a light shielding property, thereby the bank can be used as a black matrix.

A black pigment, a black dye, an inorganic material, an organic pigment, carbon black, aniline black, graphite, titanium oxide, and iron black can be used in a mixture as the black light shielding material of the bank 2 in accordance with the present invention.

Casein, gelatin, polyvinyl alcohol, carboxymethyl acetal, a polyimide resin, an acrylic resin, an epoxy resin, and a melanin resin can be appropriately selected as a resin of the material of the bank 2 in accordance with the present invention. Because photolithography is employed, a photosensitive resin is used.

Examples of dispersants for the material of the bank 2 in accordance with the present invention include nonionic surfactants such as polyoxyethylene alkyl ethers, ionic surfactants such as sodium alkylbenzenesulfonates, polyfatty acid salts, fatty acid salt alkyl phosphates, and tetraalkylammonium salts, and also organic pigment derivatives and polyesters. The dispersants may be used individually or in a mixture of two or more kinds thereof.

A solvent for the material of the bank 2 in accordance with the present invention can be appropriately selected for use on the basis of coatability and dispersion stability of the black resin composition. Examples of suitable solvents include toluene, xylene, ethyl cellosolve, ethyl cellosolve acetate, diglyme, and cyclohexanone.

The ink-repellent agent in accordance with the present invention is preferably a material comprising a silicon and/or fluorine atom that has low affinity for the resin contained in the material of the bank 2. Specific examples of ink-repellent agents include silicone resins and silicone rubbers having an organic silicone in a main or side chain and comprising a siloxane component, and also vinylidene fluoride, vinyl fluoride, ethylene trifluoride, or the like, and fluororesins such as copolymers thereof. This list is, however, not limiting.

The bank 2 is formed by photolithography. More specifically, the process involves coating the material of the bank 2 on the transparent substrate 1 to a uniform film thickness and heating (pre-baking) at a predetermined temperature. A pattern is exposed via a light shielding mask 3 onto a film 21 of the bank material coated on the transparent substrate 1. Where development is then conducted, a pattern 22 of the bank material is formed, and finally the bank 2 is formed by thermal curing (post-baking).

The following bank is formed to reduce color mixing with the adjacent colored pattern 5, increase smoothness of the surface of the colored patterns 5, and reduce pixel voids and color unevenness of the colored patterns 5 when colored inks are injected into spaces within the bank 2.

The contact angle, A, of an upper apex portion 23 of the bank 2 provided on the substrate with respect to a colored ink with a surface tension of 50 mN/m or less, for example 30 mN/m, preferably satisfies the condition: $30° \leq A \leq 60°$ C. Where $A<30°$, color mixing with the adjacent colored pattern 5 easily occurs, causing decrease in the production yield. When $A>60°$, the colored pattern 5 becomes convex, and pixel voids or color unevenness appear in the colored pattern 5.

The contact angle, A, of the upper apex portion 23 of the bank provided on the substrate with respect to a colored ink with a surface tension of 50 mN/m or less that satisfies the condition: $30° \leq A \leq 60°$ C. can be obtained by performing temperature control and/or time control in the thermal curing (post-baking) process.

Thus, when the bank 2 is heated in the thermal curing process, the ink repellent agent with a low affinity for resin contained in the bank 2 undergoes phase separation from the resin, and the ink repellent agent segregates on the upper apex portion 23 of the bank. At this time, the degree of segregation of the ink repellent agent can be controlled by heating temperature control and/or heating time control. By varying the heating temperature preferably within a range of 150-230° C. and/or varying the heating time preferably within a range of 1 min to 1 h, the contact angle of the upper apex portion 23 of the bank with respect to a colored ink with a surface tension of 50 mN/m or less can be made to satisfy the condition: $30° \leq A \leq 60°$ C.

Further, it is preferred that ink repellency of the upper apex portion 23 of the bank 2 be higher than ink repellency of the portion 24 other than the upper apex portion of the bank 2.

If this condition is met, it is more difficult for pixel voids and color unevenness of the colored pattern 5 to occur. Ink repellency of the portion 24 other than the upper apex portion of the bank 2 can be measured by polishing the bank and measuring a contact angle with respect to the colored ink on the surface. The polishing is performed, for example, to obtain ⅓ of the film thickness.

When the heating temperature is less than 150° C., the bank 2 is difficult to cure thermally, and when the heating temperature is above 230° C., the bank 2 melts, thereby making it impossible to mold the bank 2.

When the heating time is less than 1 min, thermal curing of the bank 2 is insufficient. Therefore, the bank 2 is impossible to mold. When the heating time is more than 1 h, the tack time becomes longer. Therefore, such heating time is unsuitable.

Examples of shapes of banks in the present invention include grid-shape, stripe-shape, meander-shape, honeycomb-shape or the like.

Examples of the colored inks in accordance with the present invention include an ink for a color filter and an ink for an electroluminescence device.

An ink for a color filter comprises colored pigments, resins, dispersants, and solvents.

Specific examples of pigment that can be used as colorants include Pigment Red 9, 19, 38, 43, 97, 122, 123, 144, 149, 166, 168, 177, 179, 180, 192, 215, 216, 208, 216, 217, 220, 223, 224, 226, 227, 228, 240, Pigment Blue 15, 15:6, 16, 22, 29, 60, 64, Pigment Green 7, 36, Pigment Red 20, 24, 86, 81, 83, 93, 108, 109, 110, 117, 125, 137, 138, 139, 147, 148, 153, 154, 166, 168, 185, Pigment Orange 36, and Pigment Violet 23, but this list is not limiting. Two or more kinds of pigment may be used in a mixture to obtain the desired hue.

A solvent for used in the color inks preferably has a boiling point of 130° C. or more and an appropriate surface tension range of 50 mN/m or less for the ink-jet method. Where the surface tension is 50 mN/m or more, a greatly adverse effect is provided on stability of dot shape during ink jet ejection. Where the boiling point is 130° C. or less, drying ability in the vicinity of nozzle increases significantly, thereby causing the occurrence of undesirable effects such as nozzle clogging. Specific examples of suitable solvents include 2-methoxyethanol, 2-ethoxyethanol, 2-butoxyethanol, 2-epoxyethyl acetate, 2-butoxyethyl acetate, 2-methoxyethyl acetate, 2-ethoxyethyl ether, 2-(2-ethoxyethoxy)ethanol, 2-(2-butoxyethoxy)ethanol, 2-(2-ethoxyethoxy)ethyl acetate, 2-(2-butoxyethoxy)ethyl acetate, 2-phenoxyethanol, and diethylene glycol dimethyl ether, but this list is not limiting, and any solvent satisfying the above-described requirement can be used. If necessary, solvents of two or more kinds may be used in a mixture.

Casein, gelatin, polyvinyl alcohol, carboxymethyl acetal, polyimide resins, acrylic resins, epoxy resins, and melanin resins can be used for the resins in accordance with the present invention, and the resin is appropriately selected in relation to a colorant. When heat resistance and light resistance are required, acrylic resins are preferred.

A dispersant may be used to improve dispersion of colorants in the resins. Examples of suitable dispersants include nonionic surfactants such as polyoxyethylene alkyl ethers, ionic surfactants such as sodium alkylbenzenesulfonates, polyfatty acid salts, fatty acid salt alkylphosphates, tetraalkylammonium salts, and also organic pigment derivatives and polyesters. The dispersants may be used individually or in a mixture of two or more kinds thereof. The dispersant is required to have good solubility in the solvent and also, stability in time and drying ability and is appropriately selected in relation to the colorant and resin.

An ink for an electroluminescence device comprises a light emitting material, a solvent, an additive and the like. Examples of light emitting materials include an organic light emitting body, an inorganic light emitting body and the like.

Examples of solvents include the above-mentioned solvent. An additive can be added to an ink according to need.

An ink-jet method is used to form the colored patterns 5. The ink-jet device to be used can be of a piezo conversion system or a thermal conversion system that differ in ink ejection method. The piezo conversion system is especially preferred. A device in which an ink atomization frequency is about 5-100 KHz, a nozzle diameter is about 5-80 μm, three heads are arranged, and 60-500 nozzles are assembled in one head is preferred.

The solvent is evaporated after the ink is ejected. The resin contained in the ink is then cured to obtain a substrate provided with a color pattern.

In the substrate provided with a bank and the substrate provided with a color pattern in accordance with the present invention, ink repellency of the upper apex portion of bank can be controlled. As a result, adverse effects such as color mixing caused by overflow of ink, pixel voids, and color unevenness that occur when colored layers are provided between the bank patterns can be prevented by controlling the ink repellency. As a result, a substrate provided with a color pattern that excels in properties required from substrates provided with color patterns, in particular good smoothness and excellent color characteristic, can be provided.

In addition, when a bank includes a light shielding material, the bank can have both of a light shielding function and an ink repellent function in one layer.

Embodiment 1

A color filter of an embodiment of the present invention will be described below in greater detail.

First, the bank 2 is produced.

(Fabrication of Substrate Provided with Bank)

A total of 10 parts by weight of an acrylic precursor, 7.5 parts by weight of carbon black, 130 parts by weight of NMP, 5 parts by weight of a dispersant (copper phthalocyanine derivative), 5 parts by weight of an initiator, and 0.5 part by weight of an ink-repellent agent (polyalkylsiloxane) were dispersed for 3 h under cooling in a bead mill dispersing apparatus to prepare a bank composition.

The bank composition was coated by a spin coating method on an alkali-free glass (manufactured by Corning Co., Product No. 1737), and then pre-baking was carried out for 2 min at 90° C. on a hot plate. Exposure and development were then performed, thermal curing was conducted for 15 min at 230° C. in an oven, and a bank was formed. The film thickness of the bank was 2.0 μm.

The contact angle of the upper apex portion of the bank measured with respect to a colored ink (surface tension 30 mN/m) was 45°, and the upper apex portion of the bank was confirmed to have good ink repellency with respect to the colored inks. Further, measurements of the surface tension of colored inks on the glass surface in the openings of the bank confirmed good wetting ability of the colored inks and good affinity for the colored inks.

(Preparation of Colored Inks)

A total of 20 parts by weight (60 g) of methacrylic acid, 10 parts by weight (30 g) of methyl methacrylate, 55 parts by weight (165 g) of butyl methacrylate, and 15 parts by weight (45 g) of hydroxyethyl methacrylate were dissolved in 300 g of butyl lactate, 0.75 parts by weight (2.25 g) of azobisisobutylnitrile was added under a nitrogen atmosphere, and an acrylic copolymer resin was obtained by reaction for 5 h at 70° C. The acrylic copolymer resin thus obtained was diluted with propylene glycol monomethyl ether acetate to a resin concentration of 10% and a diluted solution of acrylic copolymer resin was obtained. A total of 19.0 g of a pigment and 0.9 g of a dispersant were added to 80.1 g of the diluted solution, the components were kneaded with a three-roll system, and colored varnishes of red, green, and blue colors were obtained. Propylene glycol monomethyl ether acetate was added to the colored varnishes to obtain a pigment concentration of 12-15% and a viscosity of 15 cps, and R, G, B colored inks were obtained.

(Fabrication of Color Filter)

Colored inks of R, G, B colors were used in the openings of the bank, and colored patterns 5 (5R, 5G, 5B) of red (R), green (G), and blue (B) colors were formed with an ink-jet printing device equipped with a 12 pl, 180 dpi head.

After the colored inks have been ejected, the solvent was evaporated by heating for 1 min at 150° C. with a hot plate. The inks were then cured by heating for 1 h at 230° C. in an oven and colored patterns 5 (5R, 5G, 5B) were obtained.

A color difference, ΔEab value, of pixels comprising the colored patterns of the color filter thus obtained was measured. The results obtained demonstrated that the color filter had good smoothness and small color unevenness of ΔEab<1 within the pixels.

Embodiment 2

A bank was fabricated by the same method as that of Embodiment 1, except that the thermal curing temperature was 150° C. and thermal curing time was 60 min.

Embodiment 3

A bank was fabricated by the same method as that of Embodiment 1, except that the thermal curing temperature was 200° C. and thermal curing time was 60 min.

Embodiment 4

A bank was fabricated by the same method as that of Embodiment 1, except that the thermal curing temperature was 230° C. and thermal curing time was 60 min.

The contact angle of the upper apex portion of the bank with respect to the colored ink (surface tension 30 mN/m) obtained when the thermal curing time was constant and the thermal curing temperature was changed as in Embodiments 2-4 is shown in Table 1.

TABLE 1

|  | Embodiment 2 | Embodiment 3 | Embodiment 4 |
|---|---|---|---|
| Thermal curing temperature (° C.) | 150 | 200 | 230 |
| Contact angle (°) | 43 | 50 | 55 |

Embodiment 5

A bank was fabricated by the same method as that of Embodiment 1, except that the thermal curing temperature was 230° C. and thermal curing time was 1 min.

Embodiment 6

A bank was fabricated by the same method as that of Embodiment 1, except that the thermal curing temperature was 230° C. and thermal curing time was 35 min.

Embodiment 7

A bank was fabricated by the same method as that of Embodiment 1, except that the thermal curing temperature was 230° C. and thermal curing time was 60 min.

The contact angle of the upper apex portion of the bank with respect to the colored ink (surface tension 30 mN/m) obtained when the thermal curing temperature was constant and the thermal curing time was changed as in Embodiments 1, 5-7 is shown in Table 2.

TABLE 2

|  | Embodiment 5 | Embodiment 1 | Embodiment 6 | Embodiment 7 |
|---|---|---|---|---|
| Thermal curing temperature (° C.) | 1 | 15 | 35 | 60 |
| Contact angle (°) | 35 | 45 | 50 | 55 |

As shown in Tables 1, 2, the contact angle of colored ink (surface tension 30 mN/m) against the upper apex portion of the bank can be controlled by temperature and time of thermal curing of the bank.

The above-described results demonstrate that the contact angle of bank with respect to colored inks having various surface tension values can be controlled to a desired value, and by using such control method, it is possible to fabricate a color filter with good smoothness and no pixel void, color unevenness, or color mixing caused by overflow of ink.

COMPARATIVE EXAMPLE

A bank was fabricated by the same method as in Embodiment 1, except that the thermal curing temperature was 120° C. and thermal curing time was 60 min; in this case, the bank was not thermally cured. Further, a bank was fabricated by the same method as in Embodiment 1, except that the thermal curing temperature was 270° C. and thermal curing time was 60 min; in this case, the bank was melted and molding of the bank was impossible.

COMPARATIVE EXAMPLE 2

A bank was fabricated by the same method as in Embodiment 1, except that the thermal curing temperature was 230° C. and thermal curing time was 15 sec; in this case, thermal curing of the bank was insufficient and molding of the bank was impossible.

COMPARATIVE EXAMPLE 3

A bank was fabricated by the same method as in Embodiment 1, except that the thermal curing temperature was 230° C. and thermal curing time was 2 h; in this case, the contact angle of the upper apex portion of the bank with respect to the colored ink (surface tension 30 mN/m) was 65°, and when a color filter was fabricated by the same method as in Embodiment 1, smoothness was bad and the color had significant color unevenness with ΔEab>1 within the pixels.

(This application is incorporated by reference which is Japanese application number 2005-68612, which is filed on Mar. 11, 2005.)

What is claimed is:

1. A substrate provided with a bank, comprising:
   a transparent substrate; and
   a bank including an ink-repellent agent on the transparent substrate, wherein
   a contact angle of an upper apex portion of said bank with respect to a colored ink with a surface tension of 50 mN/m or less is 30°-60°.

2. The substrate provided with a bank according to claim 1, wherein
   a contact angle of the upper apex portion of said bank with respect to the colored ink with a surface tension of 30 mN/m or less is 30°-60°.

3. The substrate provided with a bank according to claim 1, wherein
   said bank comprises an ink-repellent agent and a resin, and affinity of the resin for the ink-repellent agent is low.

4. The substrate provided with a bank according to claim 1, wherein
   the ink-repellent agent contained in said bank is segregated on the upper apex portion of said bank.

5. The substrate provided with a bank according to claim 1, wherein
   ink repellency of the upper apex portion of said bank is higher than ink repellency of portions outside the upper apex portion of said bank.

6. A substrate provided with a color pattern comprising:
   a transparent substrate;
   a bank including an ink-repellent agent on the transparent substrate; and
   pixels comprising a colored pattern of openings within said bank, wherein
   a contact angle of an upper apex portion of said bank with respect to a colored ink with a surface tension of 50 mN/m or less is 30°-60°,
   and said pixels are formed by ejecting colored inks by an ink-jet method.

7. The substrate provided with a color pattern according to claim 6, wherein
   a contact angle of the upper apex portion of said bank with respect to the colored ink with a surface tension of 30 mN/m or less is 30°-60°.

8. The substrate provided with a color pattern according to claim 6, wherein
   said bank comprises an ink-repellent agent and a resin, and affinity of the resin for the ink-repellent agent is low.

9. The substrate provided with a color pattern according to claim 6, wherein
   the ink-repellent agent contained in said bank is segregated on the upper apex portion of said substrate provided with a color pattern.

10. The substrate provided with a color pattern according to claim 6, wherein
    ink repellency of the upper apex portion of said bank is higher than ink repellency of portions outside the upper apex portion of said bank.

11. The substrate provided with a color pattern according to claim 6, wherein
    said colored ink comprises a solvent, and the solvent has a boiling point of 130° C. or more and a surface tension of 50 mN/m or less.

12. The substrate provided with a color pattern according to claim 6, wherein
    ΔEab within said pixel is less than 1.

* * * * *